No. 862,310. PATENTED AUG. 6, 1907.
J. H. COOK.
HOLDING PIN FOR TOGGLE BOLTS AND THE LIKE.
APPLICATION FILED MAR. 28, 1907.
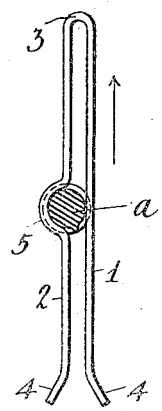
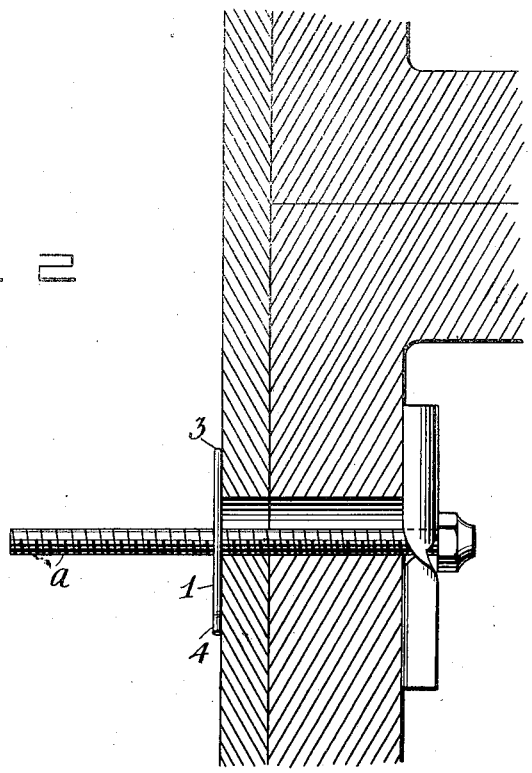
Witnesses
Inventor
John H. Cook

UNITED STATES PATENT OFFICE.

JOHN H. COOK, OF NEW YORK, N. Y.

HOLDING-PIN FOR TOGGLE-BOLTS AND THE LIKE.

No. 862,310.      Specification of Letters Patent.      Patented Aug. 6, 1907.

Application filed March 28, 1907. Serial No. 365,131.

*To all whom it may concern:*

Be it known that I, JOHN H. COOK, a citizen of the United States, residing at New York, in the county of New York and State of New York, have invented certain new and useful Improvements in Holding-Pins for Toggle-Bolts and the Like; and I do declare the following to be a full, clear, and exact description of the invention, such as will enable others skilled in the art to which it appertains to make and use the same.

This invention is an improved holding pin to be used in connection with a toggle bolt or other screw-threaded bolt or stem to prevent said bolt or stem from being casually displaced while being installed and before the nut has been screwed thereon, and it consists of a pin having a pair of arms to lie on opposite sides of a bolt or the like, provided at their free ends with outwardly-turned portions to facilitate the engagement of the pin with the bolt stem or other object, one of said arms having an offset portion to engage one side of the bolt or other object and lie in the thread thereof, as hereinafter described and claimed.

In the accompanying drawings,—Figure 1 is an elevation of a holding pin embodying my improvements, showing the same on a bolt stem, the latter being indicated in cross section; Fig. 2 is an elevation of a bolt in place in a bracket with its head in a hollowed portion of said structure, and its end protruding from the surface of said structure, and my improved holding pin in place on said bolt to prevent casual movement of the bolt.

My improved holding pin is made from a single piece of spring wire and is here shown as substantially U-shaped to provide a pair of arms 1, 2, connected together at one end by a curved portion 3, so that the said arms tend to spring together and are adapted to engage opposite sides of the bolt, pin, stem or the like cylindrical or substantially cylindrical object with which the holding pin is adapted to coact. The said arms have their outer ends turned upwardly, as at 4, to facilitate the placing of the holding pin on the bolt or other object, and the arm 2 is provided with a substantially semi-circular offset portion 5, at or about its center to bear against one side of the said bolt or other object, indicated at a, so as to fit said bolt or other object, and to lie in the screw-thread thereof and thereby prevent the holding pin from being moved longitudinally with respect to the bolt or other object, and also prevent the holding pin from moving longitudinally thereon with respect to its own length. It will be evident that in order to detach the holding pin from the bolt, or other object, it will be necessary to draw the pin forcibly in the direction indicated by the arrow in Fig. 1 to cause its arms to spread apart and release the offset 5 from the bolt.

My improved holding pin is adapted for use in connection with toggle bolts and with other bolts or objects, which, while being installed and before being completely installed, are likely to slip and become lost.

It will be understood that when a bolt, such as is shown at a, has been placed in an opening with its head bearing against an interior surface and its stem projecting from another surface, my improved pin may be readily placed astride of said projecting stem to hold said bolt from being moved casually inwardly or in the direction of its head and become lost before the nut has been placed and screwed thereon.

My holding pin is also adapted for various other useful purposes, and I do not desire to limit myself in this particular.

Having thus described my invention, what I claim as new, and desire to secure by Letters-Patent, is,—

1. A bolt pin made of spring wire bent to form a pair of spring arms which tend to move toward each other, one of said arms having an offset, at a point intermediate its ends, for the purpose set forth.

2. A bolt pin made of spring wire bent to form a pair of spring arms which tend to move toward each other, one of said arms having an offset at a point intermediate its ends, said arms having their free ends bent outwardly to facilitate the engagement thereof with a bolt or the like object.

In testimony whereof I have hereunto set my hand in presence of two subscribing witnesses.

JOHN H. COOK.

Witnesses:
 DAVID GRANT,
 L. B. MEYER.